US006922923B2

(12) United States Patent
Kondou

(10) Patent No.: US 6,922,923 B2
(45) Date of Patent: Aug. 2, 2005

(54) CHANGE-OVER VALVE FOR BOOM CYLINDER OF EXCAVATING/SLEWING WORK TRUCK

(75) Inventor: Masami Kondou, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 10/433,842

(22) PCT Filed: Nov. 29, 2001

(86) PCT No.: PCT/JP01/10453

§ 371 (c)(1),
(2), (4) Date: Dec. 8, 2003

(87) PCT Pub. No.: WO02/48553

PCT Pub. Date: Jun. 20, 2002

(65) Prior Publication Data

US 2004/0093769 A1 May 20, 2004

(30) Foreign Application Priority Data

Dec. 11, 2000 (JP) .................................... 2000-375860

(51) Int. Cl.[7] .............................................. G05D 7/01
(52) U.S. Cl. ........................... 37/348; 91/436; 91/447; 91/451
(58) Field of Search ........................ 91/451, 420, 461, 91/436, 447; 137/596.13; 37/348; 60/421, 428, 429, 430, 468

(56) References Cited

U.S. PATENT DOCUMENTS

| | | | | | |
|---|---|---|---|---|---|
| 5,005,466 | A | * | 4/1991 | Miyaoka | 91/420 |
| 5,115,835 | A | * | 5/1992 | Ueno | 137/596.13 |
| 5,218,897 | A | * | 6/1993 | Shirai et al. | 91/436 |
| 5,832,808 | A | * | 11/1998 | Ishizaki et al. | 91/447 |
| 6,708,490 | B2 | * | 3/2004 | Toji et al. | 60/421 |

FOREIGN PATENT DOCUMENTS

| | | |
|---|---|---|
| JP | 08-105403 | 4/1996 |
| JP | 08-260522 | 10/1996 |
| JP | 10-089317 | 4/1998 |

* cited by examiner

*Primary Examiner*—Victor Batson
(74) *Attorney, Agent, or Firm*—Knobbe, Martens, Olson & Bear LLP

(57) ABSTRACT

In an excavating/slewing work truck, the boom falls freely at the time of lowering operation without requiring any power but the flow rate of a pump increases excessively when the speed is balanced with other acutuators and power loss is inevitable for enhancing the operability. In order to eliminate this inconvenience, a first oil path (41) connecting a bottom side cylinder port (CB) and a tank port (T2), a second oil path (42) connecting a pump port (P2) and a rod side cylinder port (CR), and a third oil path (43) connecting a pump port (P1) and a tank port (T1) are provided, respectively, with first, second and third restrictors (61), (62) and (63) at the boom down position of a change-over valve (51) for the boom cylinder of an excavating/slewing work truck, wherein the first restrictor (61) restricts by such an amount as the work machine lowers gravitationally an the second restrictor (62) restricts by such an amount as the pressure on the boom side is not exceeded.

3 Claims, 13 Drawing Sheets

PRIOR ART

PRIOR ART

CHANGE-OVER VALVE FOR BOOM CYLINDER OF EXCAVATING/SLEWING WORK TRUCK

This application is the U.S. National Phase under 35 U.S.C. §371 of International Application PCT/JP01/10453, filed Nov. 29, 2001, which claims priority of Japanese Patent Application No. 2000-375860, filed Dec. 11, 2000. The International Application was published under PCT Article 21(2) in a language other than English.

TECHNICAL FIELD

The invention relates to a change-over valve for rotational operation of a boom of a working implement of an excavating/slewing work truck, the change-over valve being improved to reduce power loss of the hydraulic pump.

BACKGROUND ART

A conventional excavating/slewing work truck is provided at a driver's seat thereof with operation levers for rotating parts of a working machine such as a boom, an arm and a bucket. Each of the levers is connected directly or through a pilot valve to a spool of a corresponding change-over valve so as to slide the spool for changing the change-over valve.

As shown in FIG. 14, a change-over valve for a boom cylinder 23 is a three-position pilot change-over valve having six ports. When the corresponding operation lever is rotated from a neutral position to a boom down position, open areas of three oil paths in the change-over valve are gradually changed so as to make a speed-control during movement of the spool from its neutral position to its full stroke position.

The areas of the three oil paths are shown in FIG. 12. When the spool is in the neutral position, a third oil path 43 is opened for free passage so as to connect a first pump port P1 to a tank port T1, while a boom cylinder bottom side port (hereinafter, referred to as "bottom port") CB, a boom cylinder rod side port (hereinafter, referred to as "rod port") CR, a second pump port P2 and a second tank port T2 are blocked.

While the spool is moved for lowering the boom from the neutral position, the open area (c) of the third oil path 43 is rapidly restricted at an early period of the movement of spool, then it is gradually restricted, and finally the third oil path 43 is perfectly closed when the spool reaches its full stroke position.

During the same movement of spool, the open area (a) of a first oil path 41 for connecting the bottom port CB to the second tank port T2 and the open area (b) of a second oil path 42 for connecting the second pump port P2 to the rod port CR are gradually opened. The open area (a) of the first oil path 41 is open but restricted to some degree when the spool reaches its full stroke. The open area (b) of the second oil path 42 is rapidly widened just before the spool reaches the full stroke, so as to be larger than the open area (a) of the first oil path 41.

While the boom is lowered, the lowered boom is gravitationally accelerated in an early period between times t1 and t2, as shown in FIG. 13, however, an amount of oil supplied from the second oil path is increased. However, when a time t3 is reached, the increased oil supplied from the second path becomes such a level as to suddenly increase the lowering speed, thereby causing a shock.

Therefore, the first oil path is restricted so as to be narrower than the second oil path.

However, consequently, the pressure on the bottom side of the cylinder is increased so as to increase the pressure on the rod side thereof and the pump pressure, thereby causing a large power loss.

Such a power loss may be reduced by a conventional art disclosed in Japanese Laid Open Gazette No. Hei 10-89317, wherein pressure in a drain oil passage to a tank is detected for adjusting the amount of oil discharged from a pump so that oil discharged from the pump is reduced when a boom is lowered. However, this art requires a complicated hydraulic circuit and an expensive variable displacement hydraulic pump.

DISCLOSURE OF THE INVENTION

In a change-over valve for a boom cylinder of an excavating/slewing work truck according to the present invention, when the change-over valve is set at its boom down position, a first oil path connects a bottom side cylinder port to a tank port, a second oil path connects a pump port to a rod side cylinder port, a third oil path connects another pump port to another tank port, and the first, second and third oil paths are provided with respective first, second and third restrictors. The first restrictor restricts by such an amount as to gravitationally lower a work machine, and the second restrictor restricts by such an amount as not to exceed pressure on the bottom side. Therefore, while a boom is gravitationally lowered, oil pressure for lowering the boom is not applied, thereby preventing the lowered boom from being shocked.

According to the present invention, the third restrictor restricts by such an amount as to adapt an excavating/slewing work truck to be jacked up when an engine of the work truck idles, i.e. to be economically jacked up while reducing power loss.

According to the present invention, the third oil path is connected to a tank oil passage provided with a breed amount change-over valve, which automatically change the breed amount without manual operation in correspondence to a kind of work when the boom is operated.

According to the present invention, the breed amount change-over valve is provided in a spool of the change-over valve for a boom so that the breed amount is automatically changed without manual operation in correspondence to a kind of work when the boom is operated.

BEST MODE FOR CARRYING OUT THE INVENTION

A preferred embodiment of the invention will be described in accordance with the accompanying drawings.

First, description will be given of a general structure of an excavating/slewing work truck according to the present invention.

Figure 1:
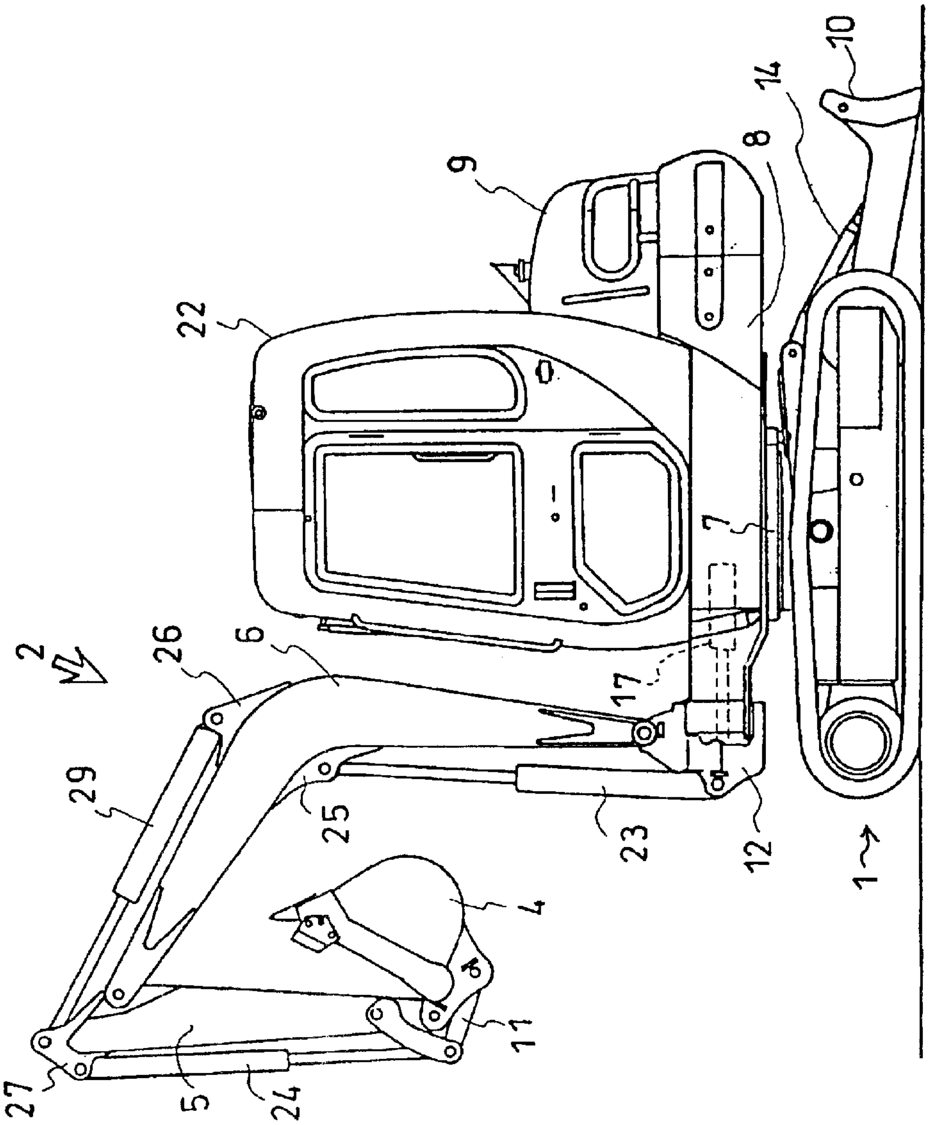
FIG. 1 is an entire side view of an excavating/slewing work truck equipped with a change-over valve according to the present invention.

As shown in FIG. 1, the excavating/slewing work truck has a crawler-type traveling device 1. A slewing frame 8 is rotatably supported through a vertical pivotal bearing 7 on the center of the traveling device 1. A blade 10 is vertically movably disposed on one of front and rear portions of the traveling device 1.

A bonnet 9 covering an engine and so on is disposed on a rear portion of the slewing frame 8. A cabin 22 enclosing a driver's portion is disposed in front of the bonnet 9.

A working machine 2 is provided on a front end portion of the slewing frame 8. With respect to the working machine 2, a boom bracket 12 is laterally rotatably attached onto the front end portion of the slewing frame 8. The boom bracket 12 longitudinally rotatably supports a lower end portion of a boom 6. The boom 6 is doglegged forward as being apparent when viewed in side. An arm 6 is rotatably supported on the other end portion of the boom 6 so as to rotatably support at a tip thereof a bucket 4 serving as a working attachment.

A boom cylinder bracket 25 is provided on an intermediate front surface of the boom 6. A boom cylinder 23 is interposed between the boom bracket 12 and the boom cylinder bracket 25. An arm cylinder bottom bracket 26 is provided on an intermediate back surface of the boom 6. A bucket cylinder bracket 27 is provided on a base end portion of the arm 5. An arm cylinder 29 is interposed between the arm cylinder bottom bracket 26 and the bucket cylinder bracket 27. The bucket cylinder 24 is interposed between the bucket cylinder bracket 27 and a stay 11 connected to the bucket 4.

Accordingly, the boom cylinder 23 acts to rotate the boom 6, the arm cylinder 29 the arm 5, and the bucket cylinder 24 the bucket 4. The boom cylinder 23, the arm cylinder 29 and the bucket cylinder 24 are hydraulic cylinders, which are telescoped by supply of pressure oil from hydraulic pumps through respective change-over valves that are switched by operating respective levers provided above the valves.

A swing cylinder 17 is disposed in a side portion of the slewing frame 8 and pivotally supported at a base portion thereof by the slewing frame 8. A tip of a cylinder rod of the swing cylinder 17 is connected to the boom bracket 12. The swing cylinder 17 acts to laterally rotate the slewing frame 8 relative to the boom bracket 12 so as to laterally rotate the working machine 2.

A hydraulic motor 13 (see FIG. 2) is provided on a top portion of the slewing frame bearing 7 so as to act to laterally rotate the slewing frame 8 in all directions. A blade cylinder 14 is interposed between a track frame 3 of the traveling device 1 and the blade 10 so as to vertically move the blade 10. Traveling hydraulic motors 15R and 15L are provided on inward sides of respective drive sprockets on one of front and rear portions of the track frame 3 so as to enable the crawler-type traveling device 1.

Figure 2:
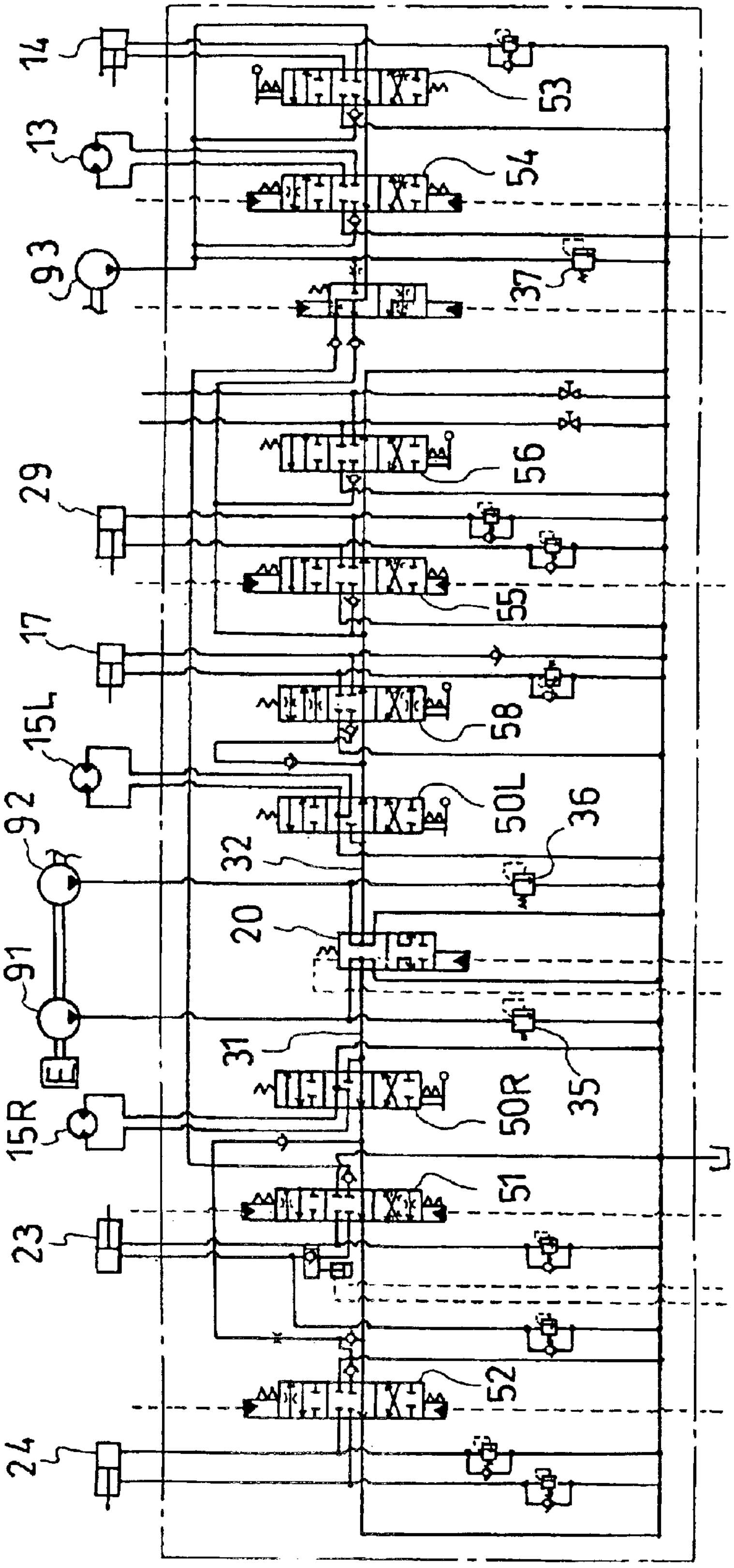
FIG. 2 is a hydraulic oil circuit diagram of a hydraulic drive device according to the present invention.

Description will now be given of a hydraulic circuit of the excavating/slewing work truck including the hydraulic cylinders and motors serving as hydraulic actuators in accordance with FIG. 2.

A first hydraulic pump 91, a second hydraulic pump 92, and a third hydraulic pump 93 are connected in parallel to an output shaft of the engine disposed in the bonnet 9. Output hydraulic paths of the first and second hydraulic pumps 91 and 92 are led through a change-over valve 20 which is opened by action of the hydraulic pumps. A first center oil path 31 serving as an output path of the first hydraulic pump 91 is connected in parallel with a relief valve 35 for setting the output hydraulic pressure therein. On the first center oil path 31 are connected a traveling hydraulic motor change-over valve 50R, a boom change-over valve 51 and a bucket change-over valve 52 in tandem. The traveling hydraulic motor change-over valve 50R is provided to change oil supply for the traveling hydraulic motor 15R provided on one of right and left sides (the right side in this embodiment). The boom change-over valve 51 is provided to change oil supply for the boom cylinder 23, and the bucket change-over valve 52 for the bucket cylinder 24.

A second center oil path 32 serving as an output path of the second hydraulic pump 92 is connected in parallel with a relief valve 36 for setting the output hydraulic pressure therein. On the second center oil path 32 are connected a traveling hydraulic motor change-over valve 50L, a swing change-over valve 58, an arm change-over valve 55 and a PTO change-over valve 53 in tandem. An output path of a third hydraulic pump 93 is provided thereon with a slewing change-over valve 54 and a blade change-over valve 53 connected in tandem and is set about output hydraulic pressure therein by a relief valve 37.

Description will be given of a structure of the boom change-over valve 51 for controlling the telescoping action of the boom cylinder 23, serving as a principal portion of the invention.

Figure 3:
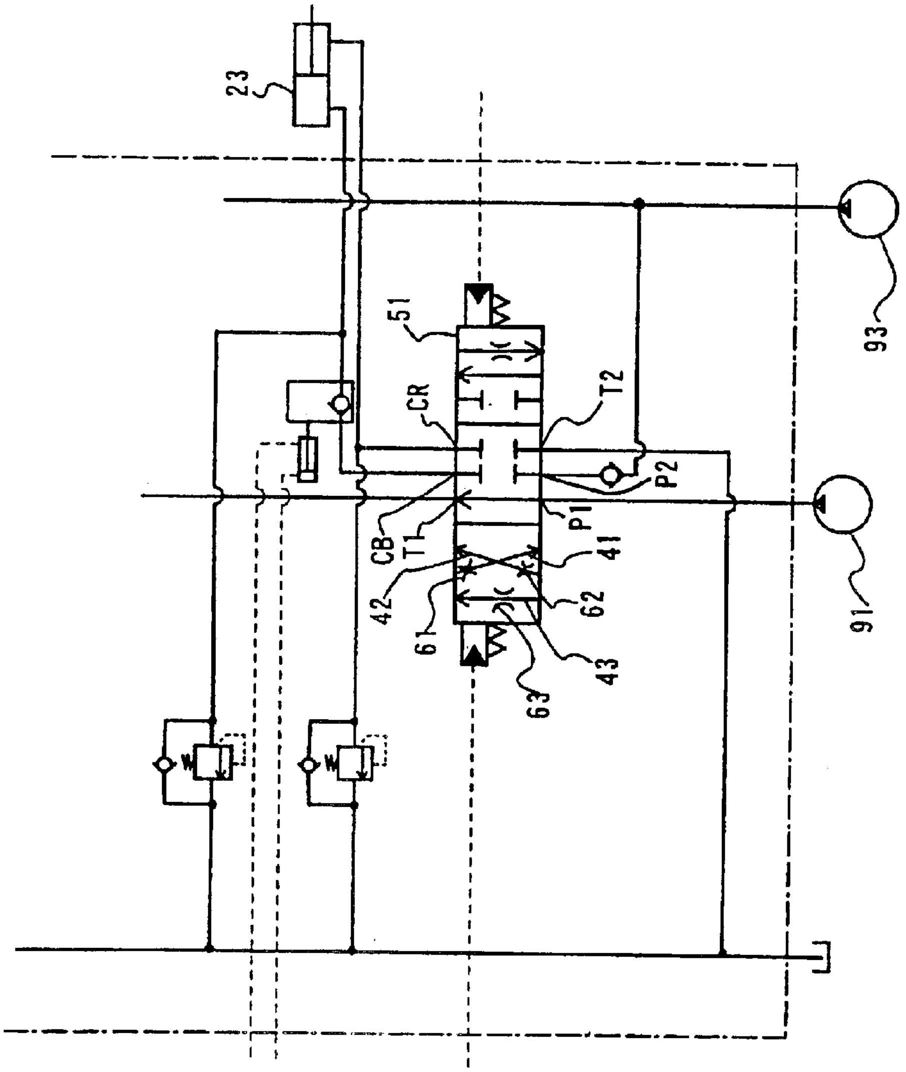
FIG. 3 is an enlarged hydraulic oil circuit diagram of a change-over valve for a boom.

As shown in FIG. 3, when the boom change-over valve 51 is set in neutral, an oil path between a first pump port P1 and a first tank port T1 is opened for free passage. A bottom port CB, a rod port CR, a second pump port P2 and a second tank port T2 are blocked so as to check flow of hydraulic oil.

When the change-over valve 51 is set for lowering the boom, the bottom port CB is connected to the second tank port T2 through a first oil path 41 with a first restrictor 61, and the rod port CR is connected to the second pump port P2 through a second oil path 42 with a second restrictor 62. Meanwhile, a third oil path 43 with a third restrictor 63 connects the first pump port P1 to the first tank port T1.

Figure 4:
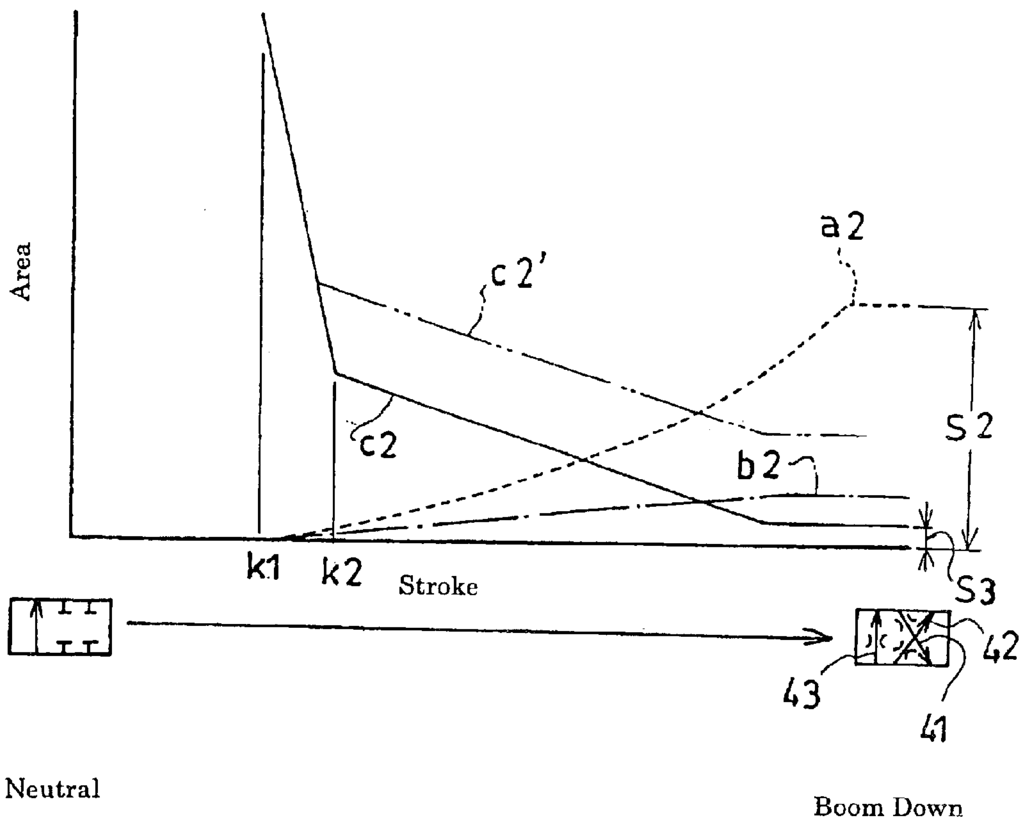
FIG. 4 is a graph showing open areas of oil paths among ports in the change-over valve relative to a stroke for lowering the boom.
Figure 12:
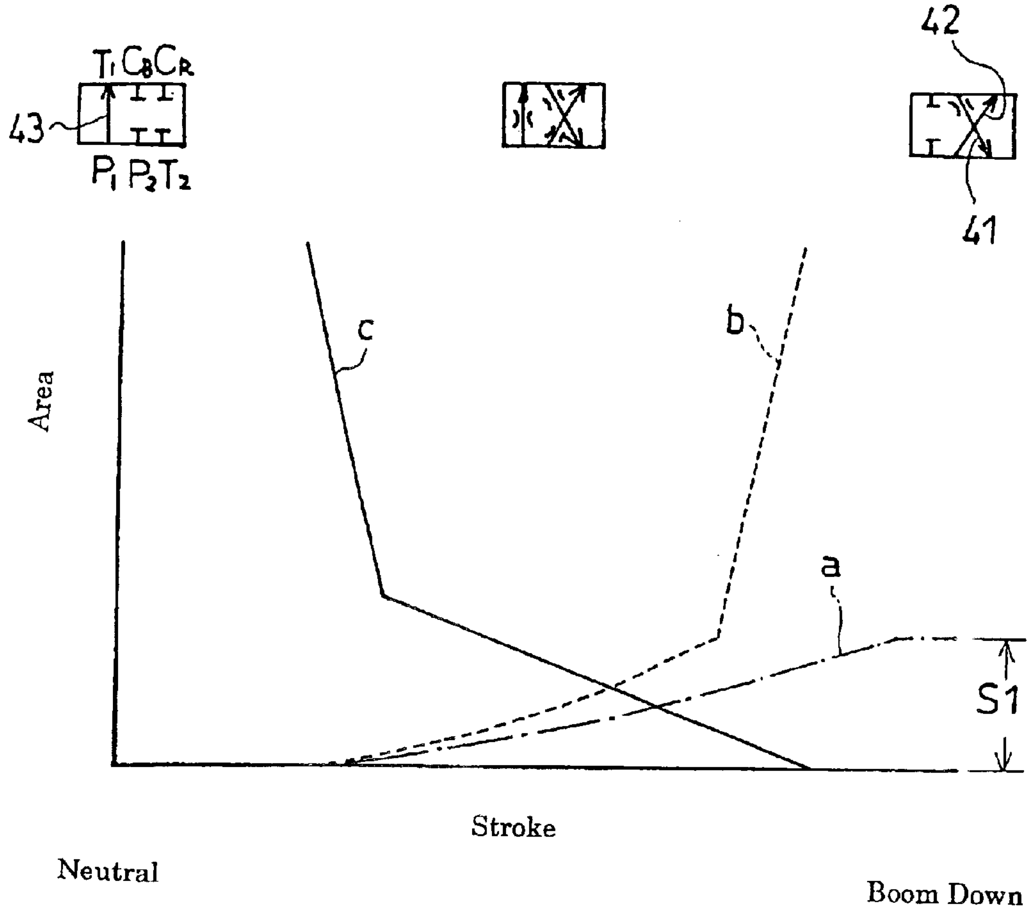
FIG. 12 is a graph showing open areas of oil paths among ports in the conventional change-over valve relative to a stroke for lowering the boom.

During the shift of the boom change-over valve 51 from the neutral position to the full boom down position, the open area variation of the restrictors of the respective oil paths 41, 42 and 43 are determined as follows:

As a graph (a2) in FIG. 4, the open area variation of the restrictor 61 of the first oil path 41 is gradually widened so as to moderate the gravitationally falling speed of the work. To prevent hydraulic pressure from pushing the piston of the boom cylinder, the open area of the restrictor according to the present invention is set to be larger than the open area of the conventional restrictor of the same kind. In the case where the valve is located in the full stroke position, for example, an open area S2 of the restrictor 61 in this embodiment is larger than an open area S1 (see FIG. 12) of the conventional restrictor.

Figure 5:
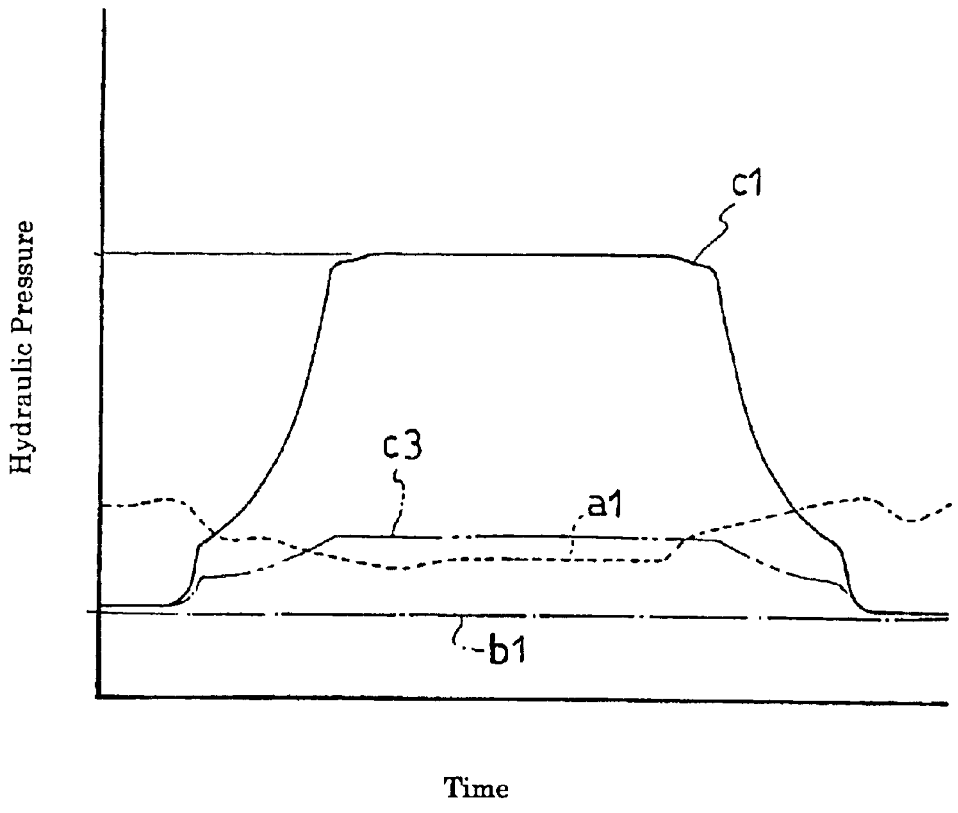
FIG. 5 is a graph showing hydraulic pressures in the change-over valve relative to a time for lowering the boom.

By the restrictor 62 of the second oil path 42, the hydraulic pressure on the rod side, as expressed by a graph (b1) drawn in a dotted line in FIG. 5, is prevented from increasing, preferably being kept to the limit. The open area thereof is gradually widened, while it is kept smaller than the open area of the first oil path 41 (see b2). While the conventional relation of open area is that b is above a, the relation of open area according to the present embodiment is that a2 is above b2.

The open area of the third oil path 43 is restricted during the shift from an initial stroke position k1 to a position k2 so as to prevent the boom from rapidly falling. At the full stroke position, the open area S3 thereof is set to a value for breed so as to prevent the hydraulic pressure in the pump outlet from excessively increasing.

Also, the breed pressure at the full stroke position is set to be applied for jacking up.

Figure 6:
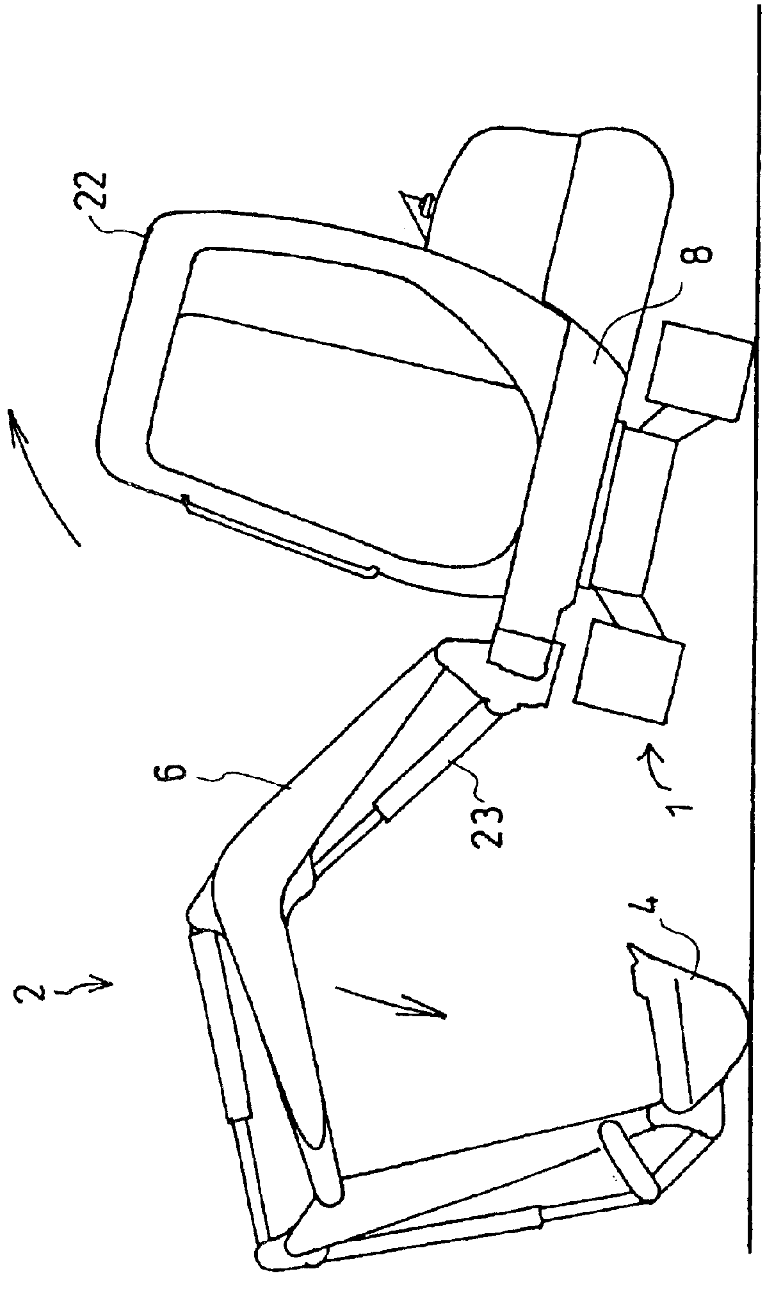
FIG. 6 is a view of the excavating/slewing work truck when it is jacked up.

In this regard, as shown in FIG. 6, if the crawler-type traveling device 1 has inspection, maintenance or the like, the slewing frame is slewed so as to locate the boom 6 in a side position of the traveling device 1, and the boom 6 is lowered so as to raise a crawler of the traveling device 1 opposite to the boom 6. This movement is referred to as jacking up. In this case, excessive breed at the full stroke position hinders such an increase of hydraulic pressure on the rod side of the boom cylinder as to be applied for jacking up. On the other hand, the greater breed with the third oil path 43 reduces the pump pressure (c1) so as to enhance the effect for energy saving. However, the breed needs to be restricted for enabling jacking up.

Therefore, according to the present invention, the amount of breed is set to the limit for enabling jacking up when the engine rotates at the lowest idling speed.

Figure 13:
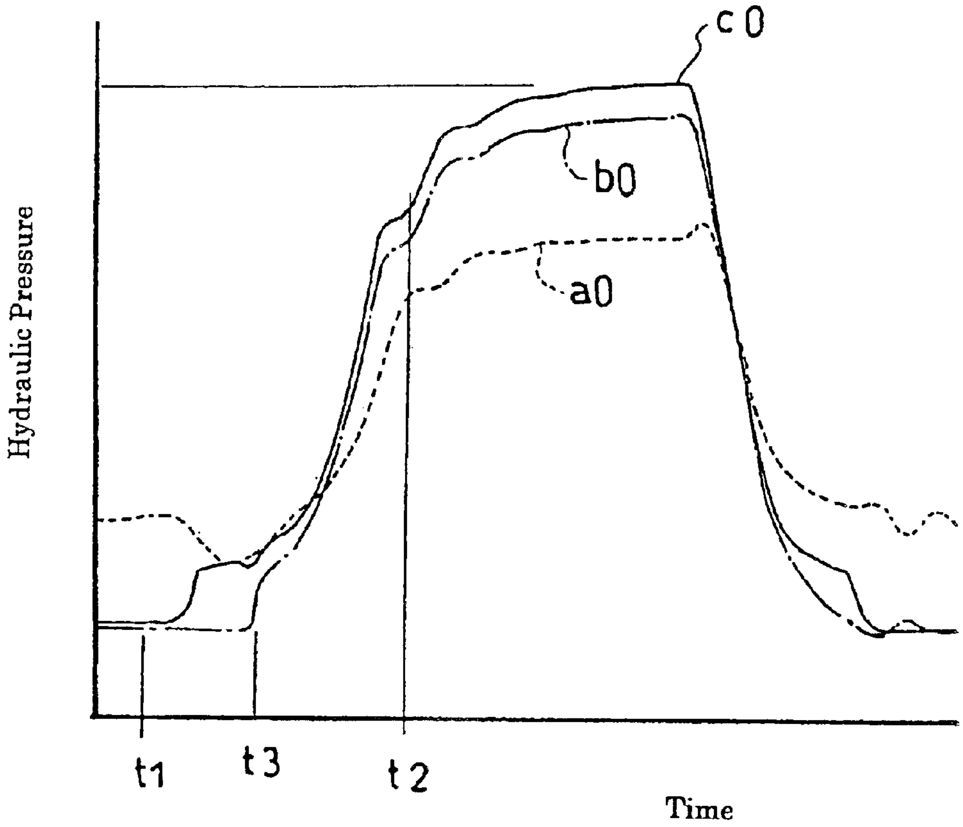
FIG. 13 is a graph showing hydraulic pressures in the conventional change-over valve relative to a time for lowering the boom.
Figure 14:
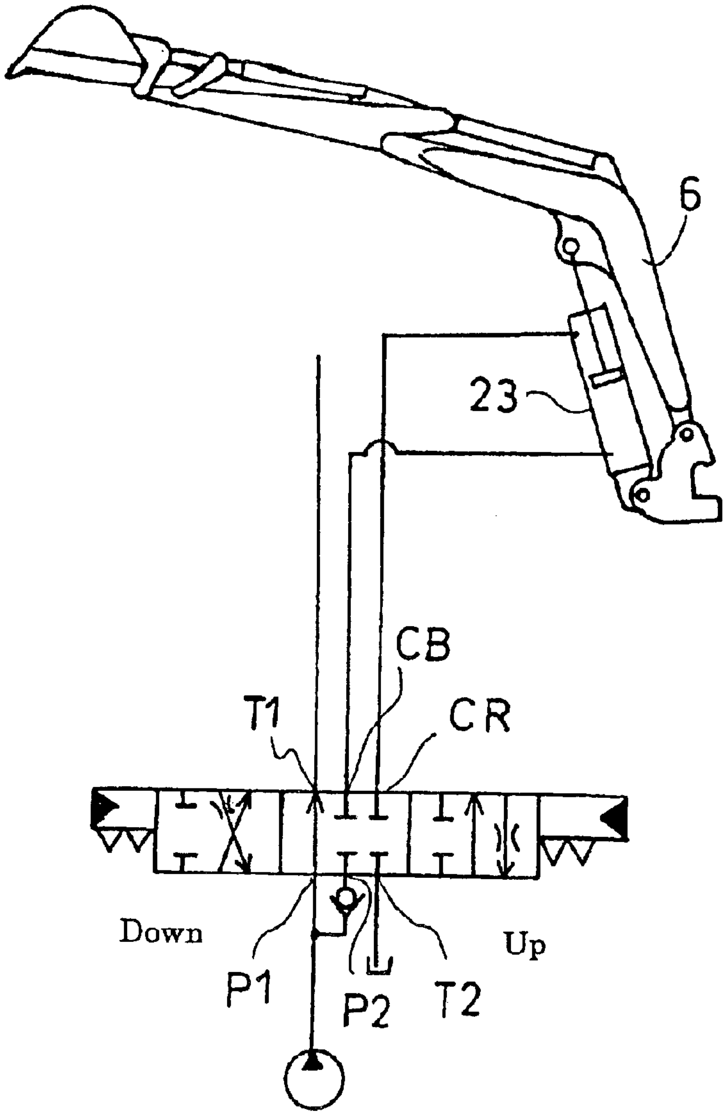
FIG. 14 is a hydraulic circuit diagram of the conventional change-over valve for the boom.

Due to the above structure and setting of open areas, the pump outlet pressure as a graph c1 in FIG. 5 is reduced lower than the conventional pump outlet pressure as a graph c0 in FIG. 13, thereby reducing power loss. When the lowered boom is accelerated, sudden shocking acceleration is avoided so as to improve operability. Furthermore, the truck can be jacked up.

Figure 7:
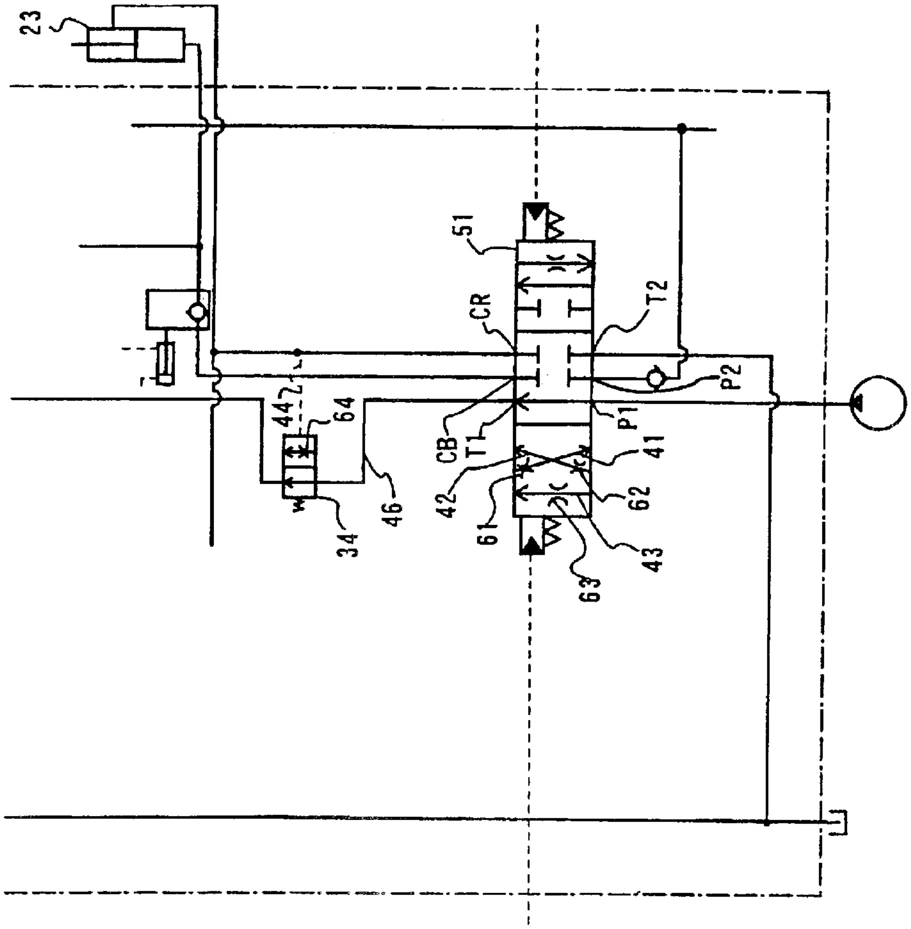
FIG. 7 is a hydraulic oil circuit diagram according to an embodiment wherein a breed amount change-over valve is provided in a tank oil passage.

Alternatively, as shown in FIG. 7, a breed amount change-over valve 34 is provided on a tank oil passage 46 secondarily connected to the third restrictor 63 through the first tank port T1 so as to reduce power loss.

The breed amount change-over valve 34 is a two-position change-valve having two ports, which has a spool operation portion connected to an oil path secondarily connected to the rod port CR through a pilot oil path 44. The breed amount change-over valve 34 at a normal position is opened for free passage. When the hydraulic pressure on the rod side of the boom cylinder is increased so as to shift the breed amount change-over valve 34, a restrict 64 reduces the breed amount, thereby increasing the pump pressure so as to be applied for jacking up. The open area of the restrictor 63 in combination with the breed amount change-over valve 34 is larger than that of the restrictor 63 without the breed amount change-over valve 34, as a graph (c2') drawn in a double dotted line in FIG. 4.

Due to the increased breed, the pump pressure is reduced so as to greatly reduce power loss, as a graph c3 in FIG. 5. In the case of jacking up, the hydraulic pressure on the rod side is increased so as to slide the spool of the breed amount change-over valve 34 through the pilot oil path 44, thereby restricting the breed amount and enabling jacking up.

The boom change-over valve 51 may incorporate the breed amount change-over valve 34.

Figure 8:
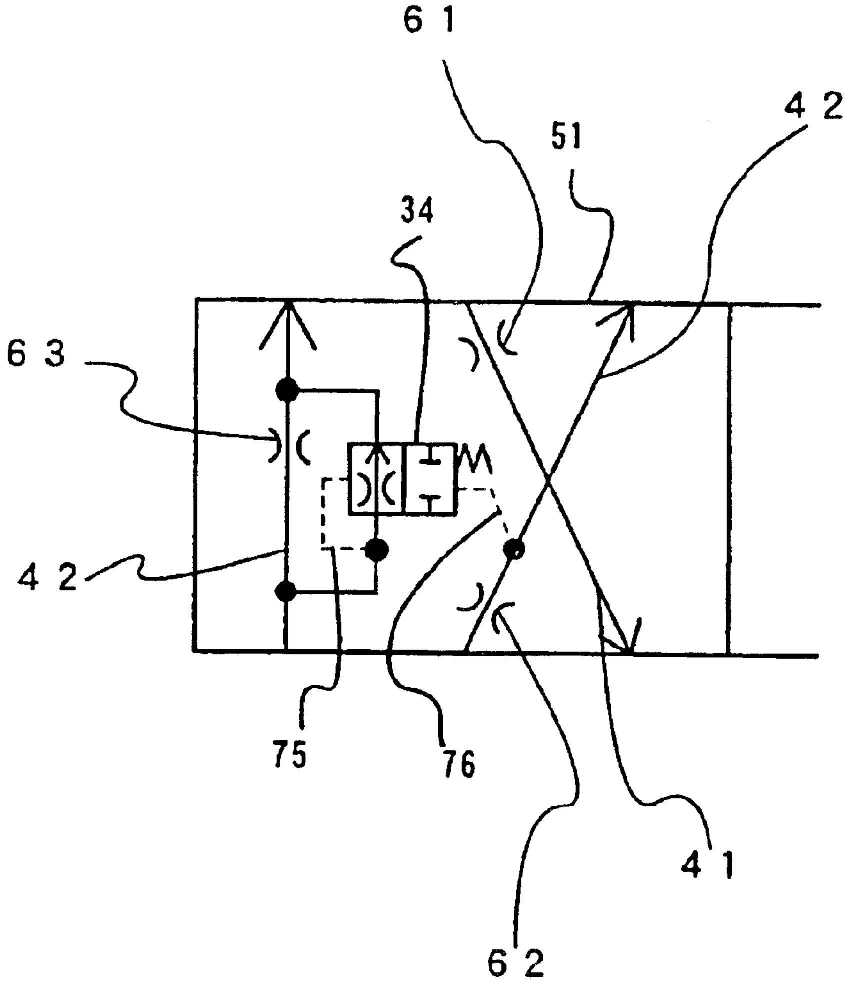
FIG. 8 is a hydraulic oil circuit diagram when the breed amount change-over valve is provided in a spool of the change-over valve for the boom.
Figure 9:
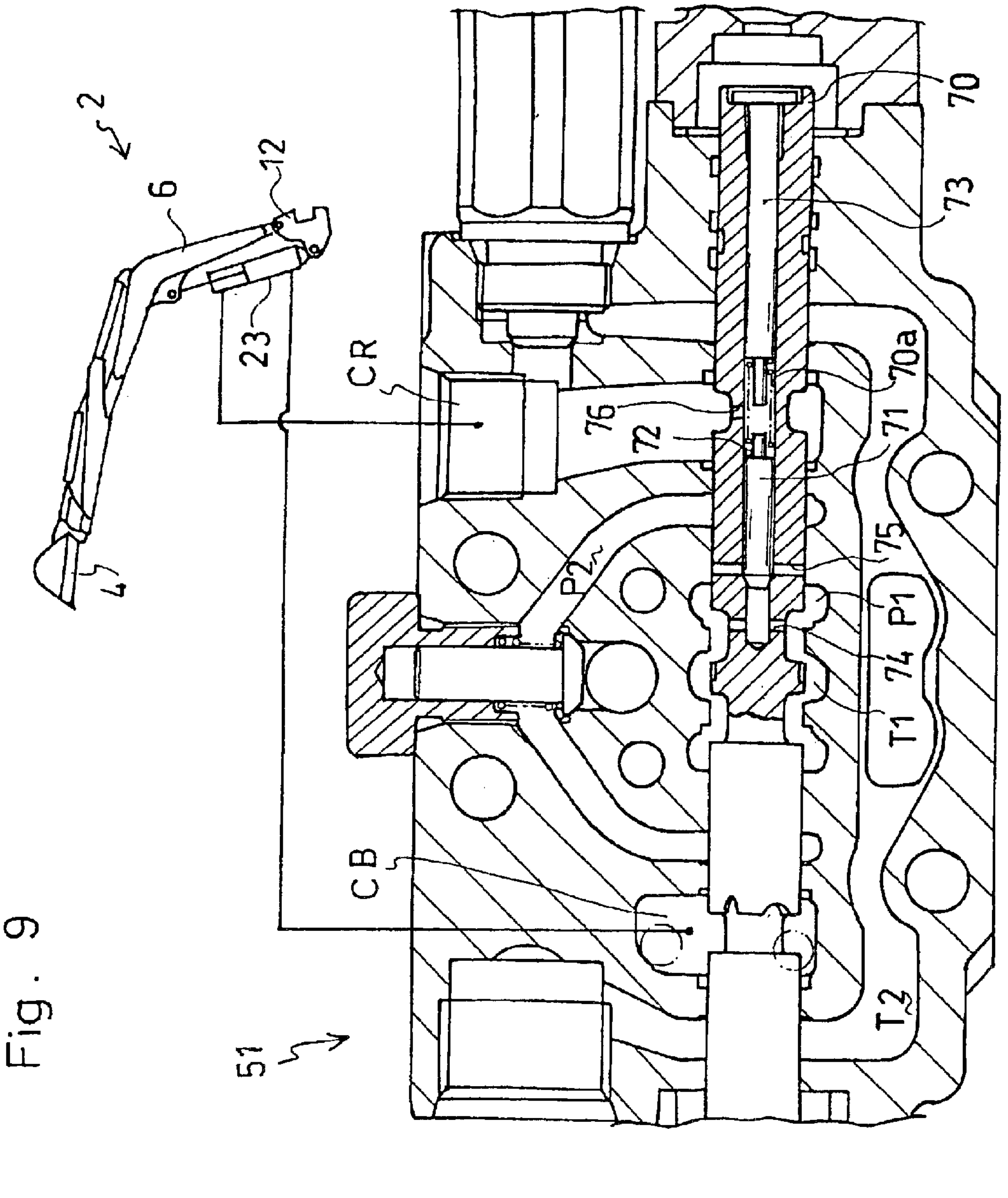
FIG. 9 is a sectional view of the breed amount change-over valve provided in the spool of the change-over valve for the boom.

In this regard, as shown in FIGS. 8 and 9, the boom change-over valve 51 is provided with a spool 70 including an axial valve hole 70*a*. A valve element 71 of the breed amount change-over valve 34 and a spring 72 for biasing the valve element 71 are inserted into the valve hole 70*a*, and a fixing bolt 73 is screwed into the valve hole 70*a* so as to close it.

Oil path holes 74, 75 and 76 are bored through the spool 70 from the outer peripheral surface of the spool 70 while intersecting the valve hole 70*a*.

FIG. 9 illustrates the boom change-over valve 51 set in neutral, wherein pressure oil flows from the pump port P to the tank port T, and the valve element 71 is biased by the spring 72 so as to separate the oil path hole 75 from the oil path hole 74.

Figure 10:
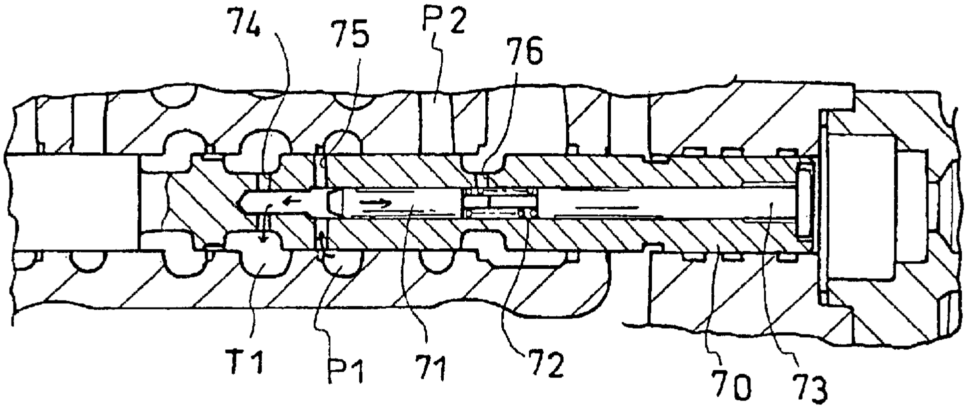
FIG. 10 is a sectional view of the same when the boom is lowered.

If the boom change-over valve 51 is shifted to the boom down position, as shown in FIG. 10, the spool 70 is slid leftward (in this figure) so as to let oil flow from the first pump port P1 to the first tank port T1 through the oil path 63, and simultaneously, the pump pressure increases so that pressure oil from the oil path hole 75 makes the valve element 71 rightward against the biasing force of the spring 72. The effect of sliding of the valve element 71 is equal to the effect of increase of open area so that the breed is increased as a graph in a double dotted line (c2') in FIG. 4.

Figure 11:
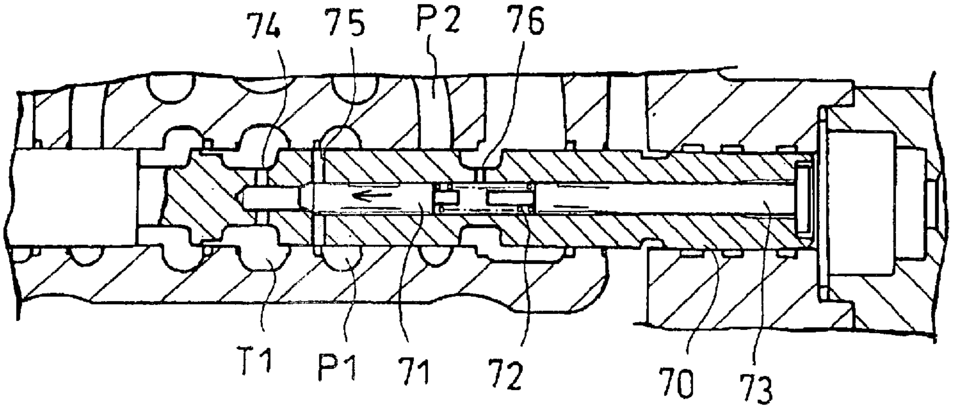
FIG. 11 is a sectional view of the same when the lowered boom reaches its full stroke.

If the work truck is going to be jacked up, the gravitational falling of the working machine 2 is stopped and the rod pressure b1 is substantially leveled with the pump pressure c1. At this time, as shown in FIG. 11, the valve element 71 is slid for closing the valve by the biasing force of the spring 72 so as to check the flow of oil from the oil path hole 75 and limit the breed amount, whereby the boom 6 is lowered by the rod pressure and enables the work truck to be jacked up.

INDUSTRIAL APPLICABIITY

According to the present invention, a change-over valve for a boom cylinder of an excavating/slewing work truck according to the present invention is so constructed that, when it is set in a boom down position, a first oil path with a first restrictor connects a bottom side cylinder port to a tank port, a second oil path with a second restrictor connects a pump port to a rod side cylinder port, a third oil path with a third restrictor connects a pump port to a tank port, the first restrictor restricts by such an amount as to gravitationally lower a working machine, and the second restrictor restricts by such an amount as not to exceed pressure on the bottom side of the boom cylinder. Therefore, when the boom is operated to be lowered, the boom is free from hydraulic pressure for lowering the boom in addition to the gravity of the working machine, thereby preventing shock, improving operability, and reducing power loss. Furthermore, such reduction of power loss can be made economically by only change of restricted oil path areas in the change-over valve for the boom cylinder.

Also, according to the present invention, the third restrictor restricts by such an amount as to enable jacking up while an engine idles, thereby reducing power loss in jacking up. Thus, maintainability of the work truck is ensured by saved energy.

Also, according to the present invention, a tank oil passage connected to the third oil path is provided with a breed amount change-over valve so as to automatically change the breed amount for saving energy without manual operation in correspondence to a kind of work when the boom is operated.

Also, according to the present invention, the breed amount change-over valve is provided in a spool of the change-over valve for the boom so that change of design is facilitated only by exchanging the spool in addition to that the breed amount for casing energy is automatically changed without manual operation in correspondence to a kind of work when the boom is operated.

What is claimed is:

1. A change-over valve for a boom cylinder of an excavating/slewing work truck, comprising:

a spool; and a breed amount change-over valve provided in said spool, wherein, when said change-over valve for the boom cylinder is set at a boom down position, said breed amount change-over valve changes the amount of flow in an oil path connecting a pump port to a tank port, and said breed amount change-over valve restricts by such an amount as to enable the work truck to be jacked up when an engine idles and a boom is lowered in full stroke.

2. A change-over valve for a boom cylinder of an excavating/slewing work truck, comprising:

a spool; and a breed amount change-over valve provided in said spool, wherein, when said change-over valve for the boom cylinder is set at a bottom down position, (i) a first restrictor of a first oil path which connects a bottom side cylinder port to a first tank port restricts by such an amount as a work machine may be gravitationally lowered, (ii) a second restrictor of a second oil path which connects a first pump port to a rod side cylinder port restricts by such an amount as pressure on the rod side cylinder port does not exceed pressure on the bottom side cylinder port, and (iii) said breed amount change-over valve changes the amount of flow in a third oil path connecting a second pump port to a second tank port.

3. A change-over valve for a boom cylinder of an excavating/slewing work truck, comprising:

a spool; and a breed amount change-over valve provided in said spool, wherein, when said change-over valve for the boom cylinder is set at a bottom down position, (i) a first restrictor of a first oil path which connects a bottom side cylinder port to a first tank port restricts by such an amount as a work machine may be gravitationally lowered, (ii) a second restrictor of a second oil path which connects a first pump port to a rod side cylinder port restricts by such an amount as pressure on the rod side cylinder port does not exceed pressure on the bottom side cylinder port, and (iii) said breed amount change-over valve changes the amount of flow in a third oil path connecting a second pump port to a second tank port, and said breed amount change-over valve restricts by such an amount as to enable the work truck to be jacked up when an engine idles and a boom is lowered in full stroke.

* * * * *